US011651613B2

United States Patent
Mu et al.

(10) Patent No.: US 11,651,613 B2
(45) Date of Patent: May 16, 2023

(54) FINGERPRINT RECOGNITION CIRCUIT, DRIVING METHOD THEREFOR, DISPLAY PANEL, AND DISPLAY DEVICE

(71) Applicants: Beijing BOE Display Technology Co., Ltd., Beijing (CN); BOE Technology Group Co., Ltd., Beijing (CN)

(72) Inventors: Wenkai Mu, Beijing (CN); Yi Liu, Beijing (CN); Xinlan Yang, Beijing (CN); Shijun Wang, Beijing (CN); Yingzi Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 156 days.

(21) Appl. No.: 17/288,669

(22) PCT Filed: Sep. 11, 2020

(86) PCT No.: PCT/CN2020/114884
§ 371 (c)(1),
(2) Date: Apr. 26, 2021

(87) PCT Pub. No.: WO2022/052061
PCT Pub. Date: Mar. 17, 2022

(65) Prior Publication Data
US 2022/0309820 A1   Sep. 29, 2022

(51) Int. Cl.
*G06K 9/28* (2006.01)
*G06V 40/13* (2022.01)

(52) U.S. Cl.
CPC .............................. *G06V 40/1306* (2022.01)

(58) Field of Classification Search
CPC .............. G06V 40/1318; H04N 5/3745; H01L 27/3234
See application file for complete search history.

(56) References Cited

U.S. PATENT DOCUMENTS

2018/0300527 A1    10/2018  Wang et al.
2022/0050984 A1*    2/2022  Park ....................... H04N 5/376
2022/0320050 A1*   10/2022  Zha ..................... G06V 40/1318

FOREIGN PATENT DOCUMENTS

CN          106250888 A       12/2016
CN          106971172 A        7/2017
(Continued)

*Primary Examiner* — Brian Werner
(74) *Attorney, Agent, or Firm* — ArentFox Schiff LLP; Michael Fainberg

(57) ABSTRACT

Embodiments of the present disclosure provide a fingerprint recognition circuit, a driving method therefor, a display panel, and a display device. The fingerprint recognition circuit includes: a photosensitive detection circuit, coupled to a bias control signal terminal and configured to receive light reflected from a fingerprint and generate a control signal; a reset control circuit, coupled to a reset signal terminal, a first control terminal, and the photosensitive detection circuit respectively, and configured to provide a signal of the reset signal terminal to the photosensitive detection circuit under control of the first control terminal; and a signal reading circuit, coupled to the photosensitive detection circuit, a power supply terminal, a second control terminal, and a signal output terminal respectively, and configured to output a corresponding fingerprint recognition signal according to the control signal under control of the second control terminal.

13 Claims, 6 Drawing Sheets

(56) References Cited

FOREIGN PATENT DOCUMENTS

| | | |
|---|---|---|
| CN | 108062540 A | 5/2018 |
| CN | 108280432 A | 7/2018 |
| CN | 110929667 A | 3/2020 |
| CN | 111553325 A | 8/2020 |
| JP | 2013069201 A | 4/2013 |

* cited by examiner

FINGERPRINT RECOGNITION CIRCUIT, DRIVING METHOD THEREFOR, DISPLAY PANEL, AND DISPLAY DEVICE

CROSS REFERENCE TO RELATED APPLICATIONS

This application is a national phase entry under 35 U.S.C. § 371 of International Application No. PCT/CN2020/114884, filed on Sep. 11, 2020, the entire content of which is incorporated herein by reference.

FIELD

The present disclosure relates to the technical field of fingerprint recognition, in particular to a fingerprint recognition circuit, a method for driving the fingerprint recognition circuit, a display panel, and a display device.

BACKGROUND

Fingerprint recognition plays a huge role in protecting personal privacy as a biometric recognition method, and almost all current electronic products on the market, such as automobiles, cell phones, and time recorders, are equipped with fingerprint recognition systems.

The fingerprint recognition technology mainly includes under-screen infrared fingerprint recognition, in-screen capacitive fingerprint recognition, and in-screen optical fingerprint recognition. For the in-screen optical fingerprint recognition technology, an optical sensor needs to be integrated inside a display device, resulting in a complex circuit structure of the display device and poor fingerprint recognition effects.

SUMMARY

Embodiments of the present disclosure provide a fingerprint recognition circuit including:

a photosensitive detection circuit, coupled to a bias control signal terminal and configured to receive light reflected from a fingerprint and generate a control signal;

a reset control circuit, coupled to a reset signal terminal, a first control terminal, and the photosensitive detection circuit respectively, and configured to provide a signal of the reset signal terminal to the photosensitive detection circuit under control of the first control terminal; and a signal reading circuit, coupled to the photosensitive detection circuit, a power supply terminal, a second control terminal, and a signal output terminal respectively, and configured to output a corresponding fingerprint recognition signal based on the control signal under control of the second control terminal.

Optionally, in embodiments of the present disclosure, the photosensitive detection circuit includes a first capacitor and a photosensitive diode.

A first electrode of the first capacitor is coupled to a first electrode of the photosensitive diode, and a second electrode of the first capacitor is coupled to a second electrode of the photosensitive diode.

The second electrode of the photosensitive diode is coupled to the bias control signal terminal.

Optionally, in embodiments of the present disclosure, the reset control circuit includes a first switch transistor.

A control terminal of the first switch transistor is coupled to the first control terminal, a first pole of the first switch transistor is coupled to the reset signal terminal, and a second pole of the first switch transistor is coupled to the photosensitive detection circuit.

Optionally, in embodiments of the present disclosure, the signal reading circuit includes a second switch transistor and a third switch transistor.

A control terminal of the second switch transistor is coupled to the photosensitive detection circuit, a first pole of the second switch transistor is coupled to the power supply terminal, and a second pole of the second switch transistor is coupled to a first pole of the third switch transistor.

A control terminal of the third switch transistor is coupled to the second control terminal, and a second pole of the third switch transistor is coupled to the signal output terminal.

Correspondingly, embodiments of the present disclosure further provide a display panel. The display panel includes a base substrate, a plurality of sub-pixels arranged in an array on the base substrate, and the above-described fingerprint recognition circuit.

The fingerprint recognition circuit is located in a row gap between adjacent sub-pixels.

Optionally, in embodiments of the present disclosure, one fingerprint recognition circuit corresponds to one sub-pixel group.

The sub-pixel group includes two rows and six columns of sub-pixels, and the fingerprint recognition circuit is located in the row gap between the two rows of the sub-pixels in the corresponding sub-pixel group.

Optionally, in embodiments of the present disclosure, the display panel further includes: a plurality of data signal lines, a reading signal line, a power supply signal line, and a reset signal line. The data signal lines, the reading signal line, the power supply signal line, and the reset signal line are extending in a sub-pixel column direction.

The reading signal line is coupled to the signal output terminal of the fingerprint recognition circuit, the power supply signal line is coupled to the power supply terminal of the fingerprint recognition circuit, and the reset signal line is coupled to the reset signal terminal of the fingerprint recognition circuit.

Extension directions of the reading signal line, the power supply signal line and reset signal line coincide with extension directions of the data signal lines.

The sub-pixel group is provided with six column gaps, and the column gaps each is located on a same side of a respective one of the columns of the sub-pixels.

The data signal lines, the reading signal line, the power supply signal line, and the reset signal line are all located in the column gaps of the sub-pixel group corresponding to the coupled fingerprint recognition circuit.

Optionally, in embodiments of the present disclosure, each of the data signal lines is arranged in a respective one of the column gaps in the sub-pixel group.

The reading signal line, the power supply signal line, and the reset signal line are respectively located in different column gaps.

Optionally, in embodiments of the present disclosure, only one of the data signal lines is arranged in the second column gap in the sub-pixel group, and only one of the data signal lines is arranged in the fifth column gap in the sub-pixel group.

Optionally, in embodiments of the present disclosure, each of line widths of the data signal lines in the second and fifth column gaps in the sub-pixel group is larger than each of line widths of the data signal lines in the remaining column gaps.

Optionally, in embodiments of the present disclosure, the display panel further includes: a suspended signal line located in a column gap.

The suspended signal line is located in a different column gap from the reading signal line, the power supply signal line, and the reset signal line.

Optionally, in embodiments of the present disclosure, the display panel further includes: a bias control signal line, a first control signal line, and a second control signal line, the bias control signal line, the first control signal line, and the second control signal line extend in a pixel row direction.

The bias control signal line is coupled to the bias control signal terminal of the fingerprint recognition circuit, the first control signal line is coupled to the first control terminal of the fingerprint recognition circuit, and the second control signal line is coupled to the second control terminal of the fingerprint recognition circuit.

The bias control signal line, the first control signal line, and the second control signal line are located in the row gap in the sub-pixel group corresponding to the coupled fingerprint recognition circuit and are arranged on two sides of the fingerprint recognition circuit.

Optionally, in embodiments of the present disclosure, the bias control signal line and the second control signal line are on a same side of the fingerprint recognition circuit of the row gap, and the first control signal line is on the other side of the fingerprint recognition circuit in the row gap.

The bias control signal line and the second control signal line are on different film layers.

Correspondingly, embodiments of the present disclosure further provide a display device, and the display device includes the above-described display panel.

Correspondingly, embodiments of the present disclosure further provide a method for driving the fingerprint recognition circuit, and the driving method includes:

in a reset time period, inputting a first control signal to the first control terminal to provide the signal of the reset signal terminal to the photosensitive detection circuit and inputting a bias control signal to the bias control signal terminal to bring the photosensitive detection circuit into a state of reverse bias;

in a detection time period, stopping inputting the first control signal to the first control terminal so the photosensitive detection circuit receives light reflected from the fingerprint and generates the control signal; and in a signal output time period, inputting a second control signal to the second control terminal so the signal reading circuit outputs the corresponding fingerprint recognition signal based on the control signal under control of the second control signal.

DETAILED DESCRIPTION OF THE EMBODIMENTS

Figure 1:
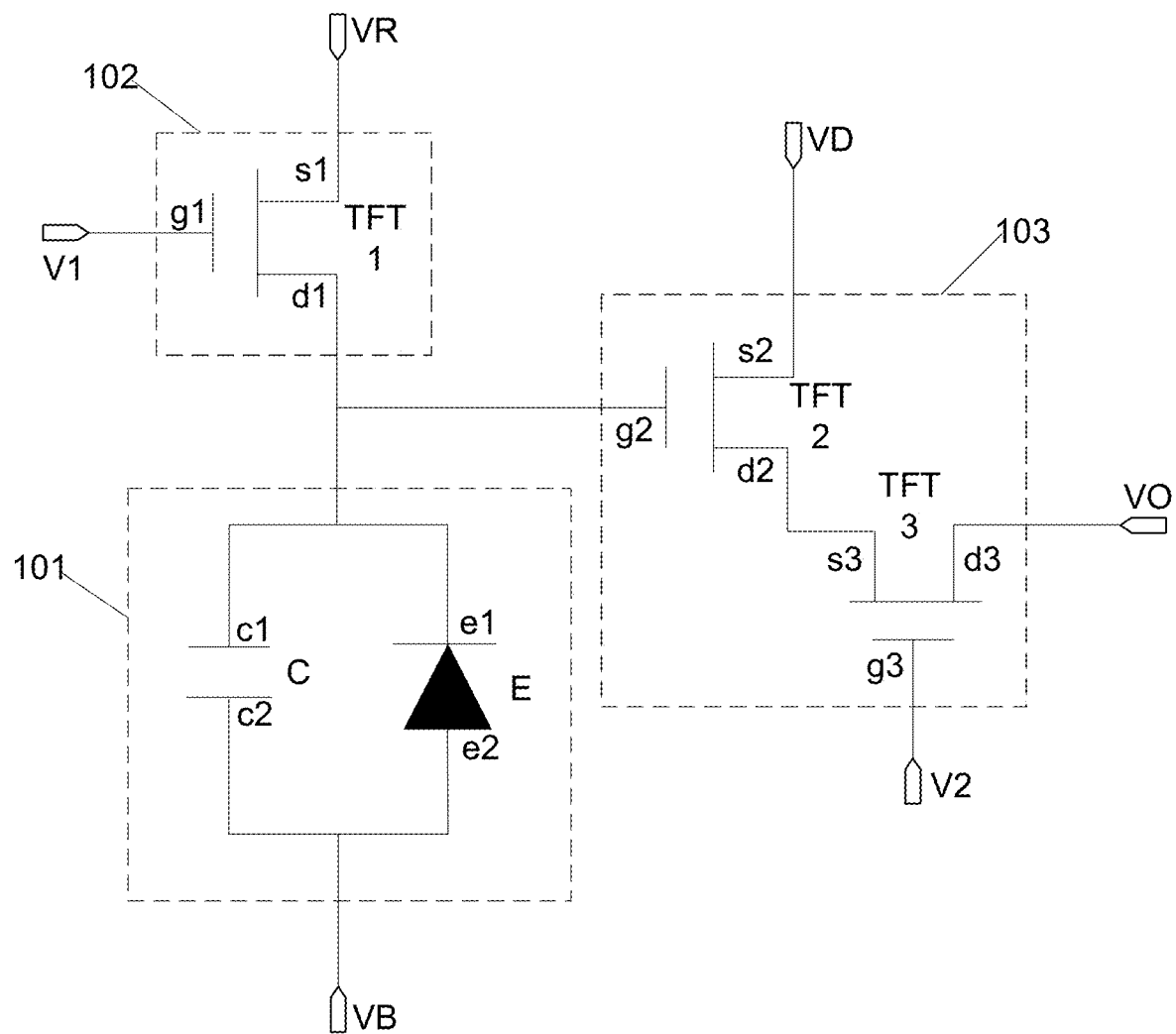
FIG. 1 is a schematic structural diagram of a fingerprint recognition circuit provided by an embodiment of the present disclosure.

With respect to the problems of complexity of a circuit structure and the poor fingerprint recognition effect of a display device existing in the related art, embodiments of the present disclosure provide a fingerprint recognition circuit, a method for driving the fingerprint recognition circuit, a display panel, and a display device.

Descriptions will now be made in detail to implementations of the fingerprint recognition circuit, the method for driving the fingerprint recognition circuit, the display panel, and the display device provided by the embodiments of the present disclosure with reference to the accompanying drawings. Sizes and shapes of structures in the drawings do not reflect the true scale, but are merely illustrative of the contents of the present disclosure.

Embodiments of the present disclosure provide a fingerprint recognition circuit. As shown in FIG. 1, the fingerprint recognition circuit includes:

a photosensitive detection circuit 101, coupled to a bias control signal terminal VB and configured to receive light reflected from a fingerprint and generate a control signal;

a reset control circuit 102, coupled to a reset signal terminal VR, a first control terminal V1, and the photosensitive detection circuit 101 respectively, and configured to provide a signal of the reset signal terminal VR to the photosensitive detection circuit 101 under control of the first control terminal V1; and a signal reading circuit 103, coupled to the photosensitive detection circuit 101, a power supply terminal VD, a second control terminal V2, and a signal output terminal VO respectively, and configured to output a corresponding fingerprint recognition signal according to the control signal under control of the second control terminal V2.

According to the fingerprint recognition circuit provided by the embodiments of the present disclosure, the photosensitive detection circuit, the reset control circuit, and the signal reading circuit are arranged. Through mutual cooperation of these three circuits, fingerprint recognition with higher detection accuracy can be achieved. Besides, the structure of the fingerprint recognition circuit is simple, thus a fingerprint recognition sensor integrated into a display device will not increase the complexity of a circuit structure in the display device.

In practical applications, the fingerprint recognition circuit provided by the embodiments of the present disclosure may be integrated in a liquid crystal display device, and in some embodiments, the fingerprint recognition circuit may be arranged in an array substrate of the liquid crystal display device. As the structure of the fingerprint recognition circuit is simple, the complexity of a circuit structure in the array substrate will not be increased. Furthermore, the fingerprint recognition circuit may also be integrated in other display devices, for example, an organic electroluminescent display device, which is not limited here.

In some embodiments, a plurality of fingerprint recognition circuits may be arranged in a display device. The fingerprint recognition circuits may convert optical signals into electrical signals after receiving reflected light from a finger, and because the intensity of the reflected light of fingerprint valleys and fingerprint ridges of the finger is different, a fingerprint image may be obtained by detecting fingerprint recognition signals output from the fingerprint recognition circuits.

Figure 2:
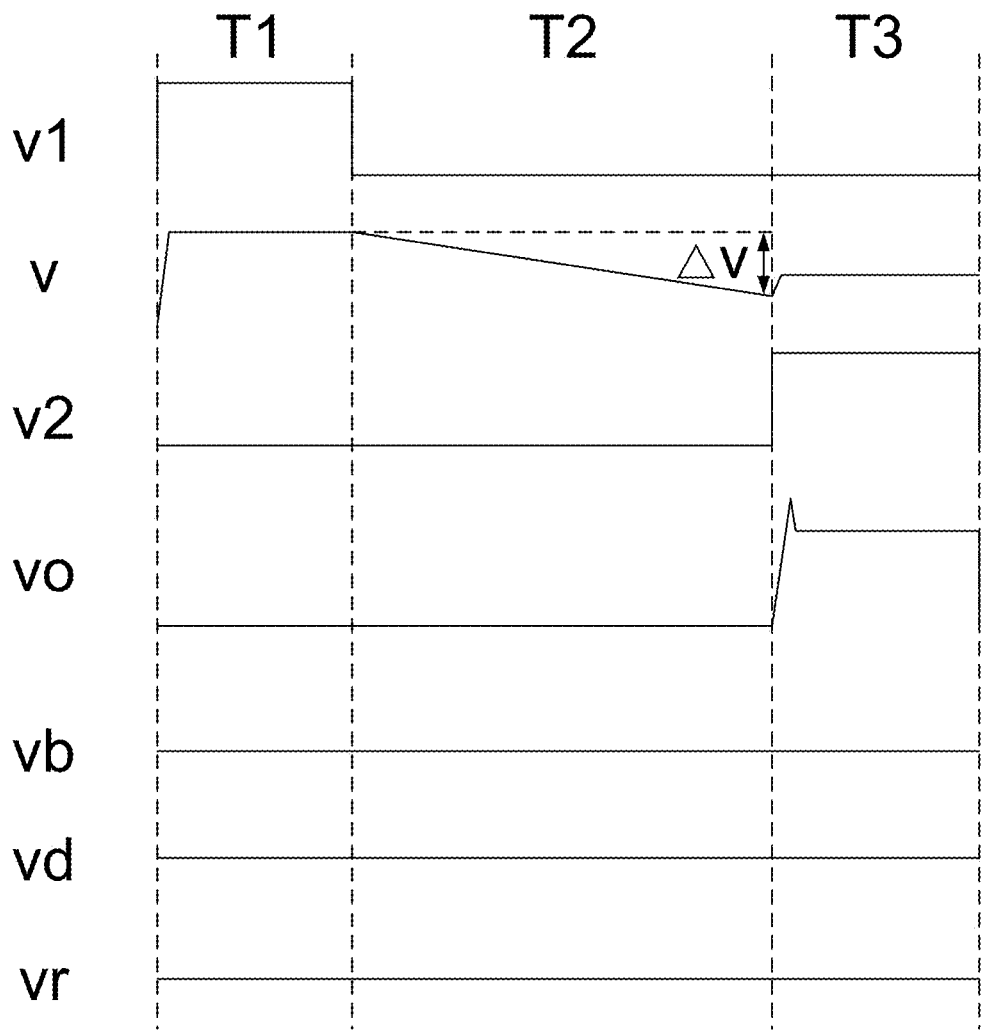
FIG. 2 is a timing diagram corresponding to the fingerprint recognition circuit shown in FIG. 1.

FIG. 2 is a timing diagram corresponding to the fingerprint recognition circuit shown in FIG. 1. The operating principle of the fingerprint recognition circuit provided by the embodiments of the present disclosure will now be explained in details with reference to FIGS. 1 and 2.

As shown in FIGS. 1 and 2, in a reset time period T1, a first control signal v1 is input to the first control terminal V1 to provide the signal of the reset signal terminal VR to the photosensitive detection circuit 101, and a bias control signal vb is input to the bias control signal terminal VB so that the photosensitive detection circuit 101 is in a reverse bias state.

In a detection time period T2, inputting of the first control signal v1 to the first control terminal V1 is stopped so each photosensitive detection circuit 101 in the display device receives the light reflected from the fingerprint at the same bias reference. As shown in FIG. 2, v denotes the control signal generated by the photosensitive detection circuit, the photosensitive detection circuit 101 converts the received light reflected from the fingerprint into the electrical signal, thereby causing changes of the control signal v. For example, the control signal v is reduced by Δv in the figure. Due to the difference in reflectivity between the fingerprint valleys and the fingerprint ridges, the light received by different photosensitive detection circuits 101 is different in intensity, so the changes Δv of the control signals v generated by the different photosensitive detection circuits 101 are different.

In a signal output time period T3, a second control signal v2 is input to the second control terminal V2, and the signal reading circuit 103 outputs a corresponding fingerprint recognition signal based on the control signal v under control of the second control signal v2. The fingerprint recognition signal is an output signal vo of the signal reading circuit 103. Due to the difference in reflectivity between the fingerprint valleys and the fingerprint ridges, the control signals v generated by the different photosensitive detection circuits 101 are different, so the fingerprint recognition signals output by the signal reading circuits 103 are different. Therefore, a fingerprint pattern may be obtained based on the fingerprint recognition signals output by the signal reading circuits 103.

In some embodiments of the present disclosure, the photosensitive detection circuit 101 in the fingerprint recognition circuit, as shown in FIG. 1, may include: a first capacitor C and a photosensitive diode E.

A first electrode c1 of the first capacitor C is coupled to a first electrode e1 of the photosensitive diode E, and a second electrode c2 of the first capacitor C is coupled to a second electrode e2 of the photosensitive diode E.

The second electrode e2 of the photosensitive diode E is coupled to the bias control signal terminal VB.

In the reset time period, the reset control circuit 102 may provide the signal of the reset signal terminal VR to the photosensitive detection circuit 101 under the control of the first control terminal V1, so the first capacitor C is charged. In the detection time period, the reset control circuit 102 stops providing the signal of the reset signal terminal VR to the photosensitive detection circuit 101, so charging of the first capacitor C is stopped. When the photosensitive detection circuit 101 receives the light reflected from the fingerprint, the photosensitive diode E converts the optical signal into the electrical signal, changing the current in a loop of the first capacitor C and the photosensitive diode E, and the first capacitor C is enabled to discharge, so the photosensitive detection circuit 101 is enabled to generate the control signal.

In some embodiments, since for the photosensitive diode E in the reverse bias state, a reverse current is greatly increased to form a photocurrent when the photosensitive diode E is illuminated by the light. The greater the intensity of the received light is, the greater the photocurrent formed by the photosensitive diode E is. Therefore, the photosensitive diode E may be controlled to detect the intensity of the light reflected from the fingerprint in the state of reverse bias. Magnitudes of the signals applied to the reset signal terminal VR and the bias control signal terminal VB in the reset time period may be determined based on a specific structure of the photosensitive diode E. For example, when the first electrode e1 of the photosensitive diode E is a cathode and the second electrode e2 of the photosensitive diode E is an anode, the signal applied to the reset signal terminal VR is larger than the signal applied to the bias control signal terminal VB. For instance, an 8V signal may be applied to the reset signal terminal VR and a 3V signal may be applied to the bias control signal terminal VB, thereby maintaining the photosensitive diode E in the reverse bias state. When the first electrode e1 of the photosensitive diode E is an anode and the second electrode e2 of the photosensitive diode E is a cathode, the signal applied to the reset signal terminal VR is smaller than the signal applied to the bias control signal terminal VB. For instance, a 3V signal may be applied to the reset signal terminal VR and an 8V signal may be applied to the bias control signal terminal VB, thereby maintaining the photosensitive diode E in the reverse bias state.

In the embodiments of the present disclosure, descriptions are made taking the photosensitive detection circuit 101 including the first capacitor C and the photosensitive diode E as an example. In other embodiments, the photosensitive detection circuit 101 may also be composed of other components, which is not limited here.

Optionally, in the above fingerprint recognition circuit provided by the embodiments of the present disclosure, as shown in FIG. 1, the reset control circuit 102 may include: a first switch transistor TFT1.

A control terminal g1 of the first switch transistor TFT1 is coupled to the first control terminal V1, a first pole s1 is coupled to the reset signal terminal VR and a second pole d1 is coupled to the photosensitive detection circuit 101. The second pole d1 of the first switch transistor TFT1 may be coupled to the first electrode e1 of the photosensitive diode E.

The control terminal g1 of the above-mentioned first switch transistor TFT1 is coupled to the first control terminal V1, so under control of the first control terminal V1, the first pole s1 and the second pole d1 of the first switch transistor TFT1 may be conducted, thereby providing the signal of the reset signal terminal VR to the photosensitive detection circuit 101. For example, when the first switch transistor TFT1 is an N-type transistor, a high level signal may be applied to the control terminal g1 of the first switch transistor TFT1 to enable the first pole s1 and the second pole d1 of the first switch transistor TFT1 to be conducted.

In the embodiments of the present disclosure, descriptions are made taking the reset control circuit 102 including the first switch transistor TFT1 as an example. In other embodiments, the reset control circuit 102 may also be composed of other components, which is not limited here.

In the fingerprint recognition circuit provided by the embodiments of the present disclosure, as shown in FIG. 1, the signal reading circuit 103 may include: a second switch transistor TFT2, and a third switch transistor TFT3.

A control terminal g2 of the second switch transistor TFT2 is coupled to the photosensitive detection circuit 101, a first pole s2 is coupled to the power supply terminal VD and a second pole d2 is coupled to a first pole s3 of the third switch transistor TFT3.

A control terminal g3 of the third switch transistor TFT3 is coupled to the second control terminal V2 and a second pole d3 is coupled to the signal output terminal VO.

As shown in FIG. 1, the control terminal g2 of the second switch transistor TFT2 is coupled to the photosensitive detection circuit 101. For example, the control terminal g2 of the second switch transistor TFT2 is coupled to the first electrode e1 of the photosensitive diode E, that is to say, the conduction state of the second switch transistor TFT2 is controlled by the control signal generated by the photosensitive detection circuit 101. Since a drain current of the second switch transistor TFT2 is in corresponding relevance to a gate current of the second switch transistor TFT2, the drain current may be an output current of the second switch transistor TFT2 at the second pole d2 and the gate current may be a control current of the second switch transistor TFT2 at the control terminal g2, the control signal generated by the photosensitive detection circuit 101 eventually affects the drain current of the second switch transistor TFT2. Thus, by reading the drain current of the second switch transistor TFT2, the intensity of the light reflected from the fingerprint received by the photosensitive detection circuit 101 may be obtained, and by reading drain currents of second switch transistors TFT2 of a plurality of fingerprint recognition circuits, the fingerprint pattern of the finger may be obtained.

In practical applications, the control terminal g3 of the third switch transistor TFT3 is coupled to the second control terminal V2 and the second pole d3 is coupled to the signal output terminal VO. In the signal output time period, the third switch transistor TFT3 may be conducted by inputting the second control signal v2 to the second control terminal V2, thereby conducting the second pole d2 of the second switch transistor TFT2 and the signal output terminal VO, and the signal output terminal VO outputs the fingerprint recognition signal corresponding to the control signal.

In the embodiments of the present disclosure, descriptions are made taking the signal reading circuit 103 including the second switch transistor TFT2 and the third switch transistor TFT3 as an example. In other embodiments, the signal reading circuit 103 may also be composed of other components, which is not limited here.

Based on the same inventive concept, embodiments of the present disclosure further provide a display panel. Since the problem solving principle of the display panel is similar to that of the above-described fingerprint recognition circuit, implementation of the display device can be referred to the implementation of the fingerprint recognition circuit, and the repetition thereof will not be described.

Figure 3:
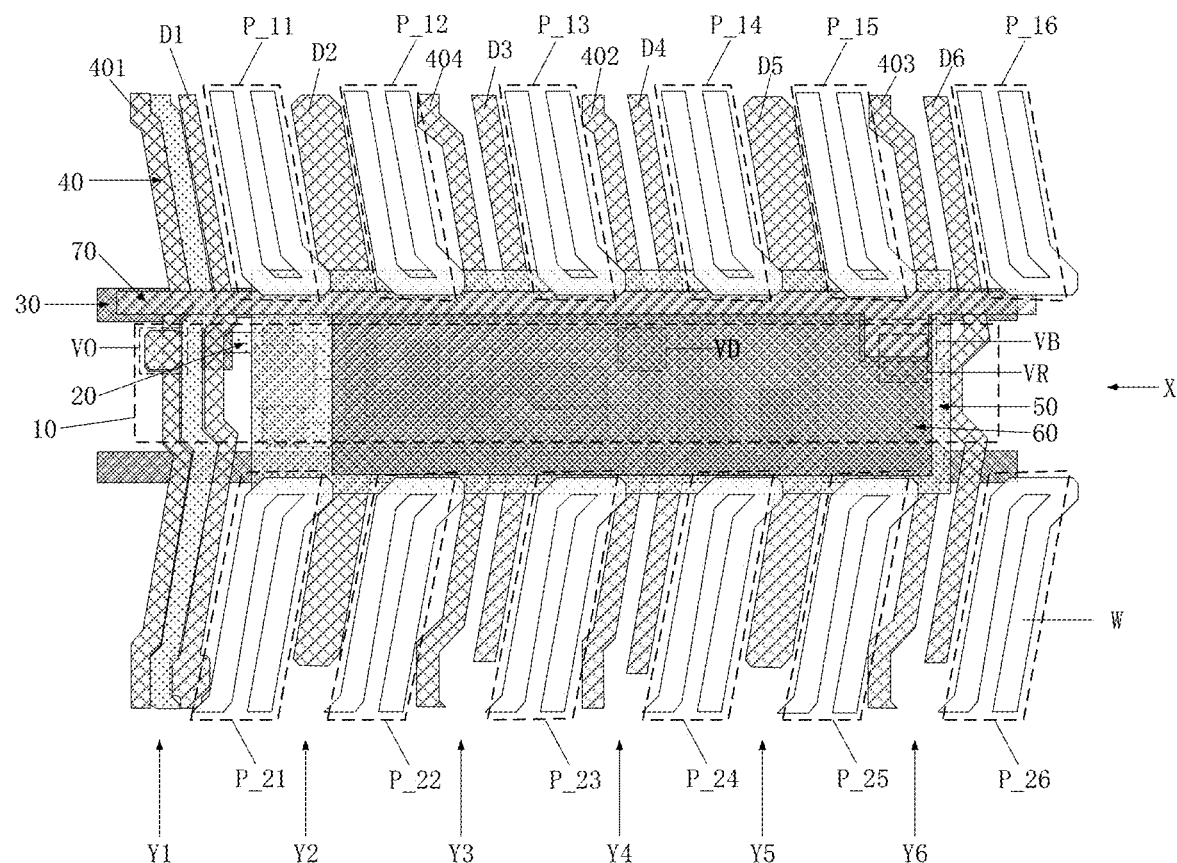
FIG. 3 is a schematic structural diagram of a film layer of a display panel provided by an embodiment of the present disclosure.

As shown in FIG. 3, the display panel provided by the embodiments of the present disclosure may include: a base substrate (not shown), a plurality of sub-pixels arranged in an array (e.g., P_11, P_12, P_13, etc. in the figure) on the base substrate, and the fingerprint recognition circuit 10 described above.

The fingerprint recognition circuit 10 is located in a row gap X between the adjacent sub-pixels.

In the display panel provided by the embodiments of the present disclosure, the fingerprint recognition circuit is arranged on the base substrate and is integrated into the display panel, so a fingerprint pattern of a finger touching the display panel may be obtained through a fingerprint recognition signal output by the fingerprint recognition circuit. The fingerprint recognition circuit is simple in structure, so the complexity of a circuit structure in the display panel will not be increased. In addition, the fingerprint recognition circuit is arranged in the row gap between the adjacent sub-pixels so it does not occupy opening areas of the sub-pixels, i.e., the display effect of the display panel is not affected. Signal lines coupled to the fingerprint recognition circuit may be arranged in column gaps between the sub-pixels, which facilitates routing design of the signal lines.

In some embodiments, in order to accurately detect the fingerprint pattern of the finger, a plurality of fingerprint recognition circuits may be arranged in a fingerprint recognition area of the display panel, and through fingerprint recognition signals output from the fingerprint recognition circuits, a complete fingerprint pattern may be obtained by using an image splicing technology. In implementation, the fingerprint recognition area may be a part of a display area of the display panel, or the fingerprint recognition area may coincide with the display area, i.e., the display panel in the embodiments of the present disclosure may realize a partial-area fingerprint recognition function or may realize a full-screen fingerprint recognition function, where the size of the fingerprint recognition area is not defined.

In the above-described display panel provided by the embodiments of the present disclosure, as shown in FIG. 3, one fingerprint recognition circuit 10 corresponds to one sub-pixel group, and the sub-pixels in FIG. 3, i.e. P_11, P_12, P_13, P_14, P_15, P_16, P_21, P_22, P_23, P_24, P_25, and P_26, may constitute one sub-pixel group.

The sub-pixel group includes two rows and six columns of sub-pixels (each sub-pixel being distributed in the two rows and six columns as shown in FIG. 3) and the fingerprint recognition circuit 10 is located in the row gap X between the two rows of sub-pixels in the corresponding sub-pixel group.

In order to realize color display, the display panel may include at least three colors of sub-pixels. For instance, the display panel may include sub-pixels of three colors of red, green, and blue. To take a pixel unit composed of a red sub-pixel, a green sub-pixel and a blue sub-pixel as an example, each sub-pixel group may correspond to 2×2 pixel units. As shown in FIG. 3, the first row of sub-pixels P_11, P_12, P_13, P_14, P_15, and P_16 may be arranged in the order of red, green, blue, red, green, and blue, and the second row of sub-pixels P_21, P_22, P_23, P_24, P_25, and P_26 may be arranged in the order of red, green, blue, red, green, and blue. Also, as shown in FIG. 3, in order to control light emission of the sub-pixels, the embodiments of the present disclosure further include a plurality of pixel electrodes W.

In the embodiments of the present disclosure, each fingerprint recognition circuit 10 corresponds to 2×2 pixel units, so fingerprint recognition accuracy may be satisfied, and a clear fingerprint pattern may be obtained. Furthermore, the fingerprint recognition circuit 10 is arranged in the row gap X between two rows of sub-pixels in the corresponding sub-pixel group, so it does not occupy opening areas of the sub-pixels, i.e., the display effect of the display panel is not affected. Besides, signal lines coupled to the fingerprint recognition circuit may be arranged in column gaps between the sub-pixels, which facilitates routing design of the signal lines.

The above-described display panel provided by the embodiments of the present disclosure, as shown in FIG. 3, may further include: a plurality of data signal lines (shown as D1, D2, D3, D4, D5, and D6 in FIG. 3) extending in the column direction of the sub-pixels, a reading signal line 401, a power supply signal line 402, and a reset signal line 403.

The reading signal line 401 is coupled to the signal output terminal VO of the fingerprint recognition circuit 10, the power supply signal line 402 is coupled to the power supply terminal VD of the fingerprint recognition circuit 10, and the reset signal line 403 is coupled to the reset signal terminal VR of the fingerprint recognition circuit 10.

The extension directions of the reading signal line 401, the power supply signal line 402, and the reset signal line 403 coincide with the extension directions of the data signal lines.

The sub-pixel group has six column gaps (column gaps Y1, Y2, Y3, Y4, Y5, and Y6 in FIG. 3) which are located on the same side of the columns of sub-pixels, and as shown in the figure, each column gap is located on the left side of the corresponding column of sub-pixels.

The data signal lines, the reading signal line 401, the power supply signal line 402, and the reset signal line 403 are positioned in the column gaps of the sub-pixel group corresponding to the coupled fingerprint recognition circuit 10.

The reading signal line 401, the power supply signal line 402, and the reset signal line 403 are arranged in the column gaps of the sub-pixel group corresponding to the coupled fingerprint recognition circuit 10, thereby facilitating coupling with the corresponding fingerprint recognition circuit 10, and they do not occupy the opening areas of the sub-pixels, i.e., the display effect of the display panel is not affected.

Figure 5:
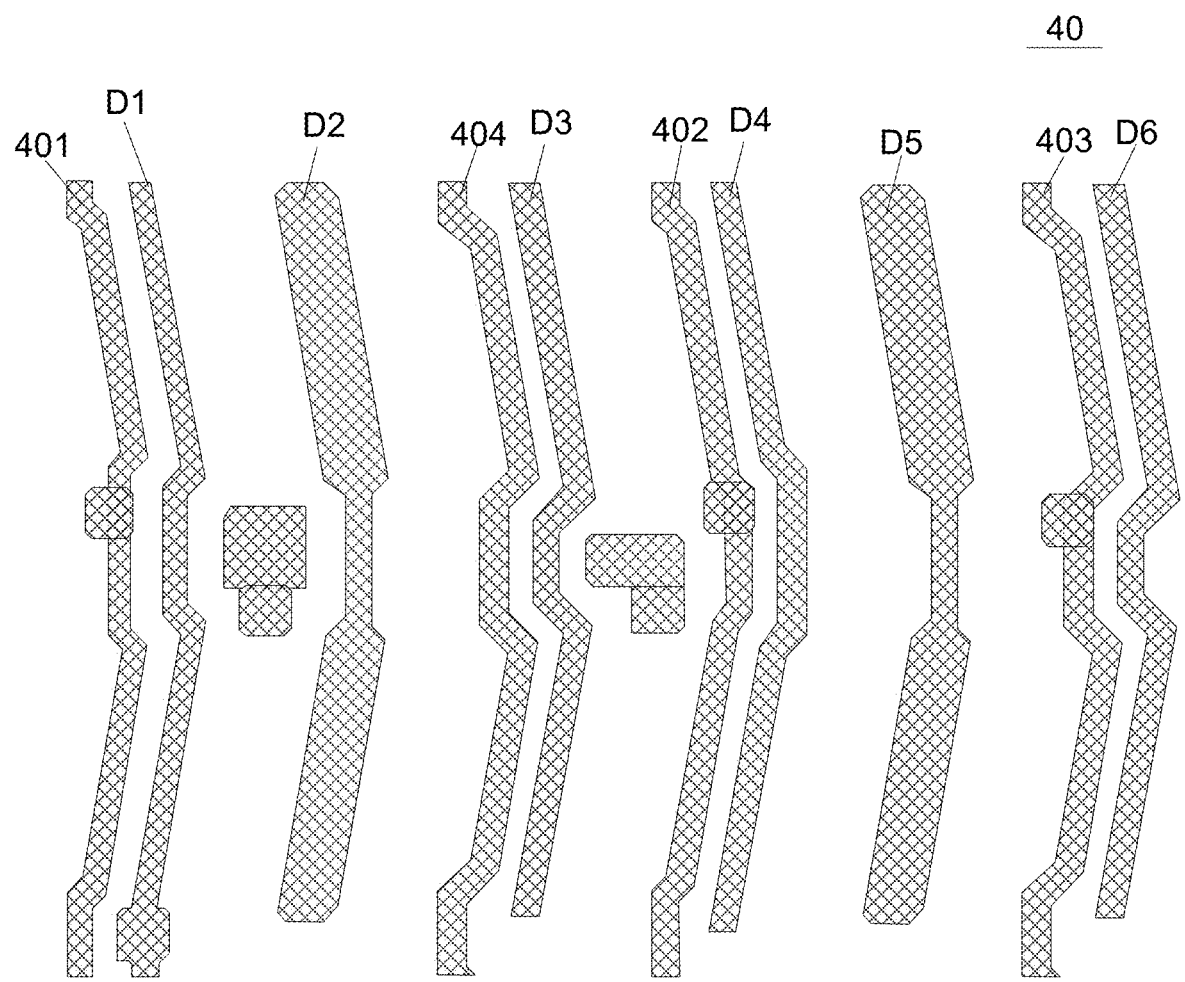
FIG. 5 a schematic top view of a first conductive layer in an embodiment of the present disclosure.

In the above-described display panel provided by the embodiments of the present disclosure, the data signal lines, the reading signal line 401, the power supply signal line 402, and the reset signal line 403 may be located on a same film layer. For example, they may be all located on a first conductive layer 40. FIG. 5 is a schematic structural diagram of the first conductive layer 40. As shown in FIGS. 3 and 5, one data signal line is arranged in each column gap in the sub-pixel group. As shown in FIG. 3, a data signal line D1 is located in the column gap Y1, a data signal line D2 is located in the column gap Y2, a data signal line D3 is located in the column gap Y3, a data signal line D4 is located in the column gap Y4, a data signal line D5 is located in the column gap Y5, and a data signal line D6 is located in the column gap Y6, thereby facilitating coupling of the data signal lines to the sub-pixels in the corresponding sub-pixel columns. Therefore, the data signal lines provide data signals to the coupled sub-pixels, and signal crosstalk between the adjacent data signal lines may be avoided, thereby ensuring the good display effect of the display panel.

The reading signal line 401, the power supply signal line 402, and the reset signal line 403 are located in different column gaps, which can avoid signal crosstalk between the reading signal line 401, the power supply signal line 402, and the reset signal line 403 and guarantee high fingerprint recognition accuracy of the fingerprint recognition circuit.

Further, in the above-described display panel provided by the embodiments of the present disclosure, as shown in FIG. 3, only one data signal line is arranged in each of the second and fifth column gaps (i.e., the column gap Y2 and the column gap Y5) in the sub-pixel group, that is, no signal line except the data signal line D2 is arranged in the column gap Y2 and no signal line except the data signal line D5 is arranged in the column gap Y5. In other words, the reading signal line 401, the power supply signal line 402, and the reset signal line 403 are distributed in the column gaps Y1, Y4, and Y6, so that the reading signal line 401, the power supply signal line 402, and the reset signal line 403 are evenly distributed in the column gaps of the corresponding sub-pixel group.

In the above-described display panel provided by the embodiments of the present disclosure, as shown in FIG. 3, line widths of the data signal lines in the second and fifth column gaps in the sub-pixel group are larger than line widths of the data signal lines in the remaining column gaps, i.e., the line widths of the data signal lines D2 and D5 are larger than those of the data signal lines D1, D3, D4, and D6. Since only one data signal line is arranged in the column gap Y2 and in the column gap Y5 respectively, there is sufficient space in the column gap Y2 and the column gap Y5, and the line widths of the data signal lines D2 and D5 are large, thereby achieving small resistance of the data signal lines D2 and D5. In addition, the total width of the vertical signal line in each of the column gaps Y2 and Y5 may be consistent with the total width of the vertical signal line in each of the remaining column gaps, thereby improving the uniformity of the vertical signal lines in the column gaps corresponding to the sub-pixel group, resulting in good display uniformity of the display panel.

In practical applications, as shown in FIG. 3, the above-described display panel provided by the embodiments of the present disclosure may further include: a suspended signal line 404 located in a column gap.

The suspended signal line 404 is located in the column gap different from those of the reading signal line 401, the power supply signal line 402, and the reset signal line 403. As shown in FIG. 3, the reading signal line 401 is located in the column gap Y1, the suspended signal line 404 is located in the column gap Y3, the power supply signal line 402 is located in the column gap Y4, and the reset signal line 403 is located in the column gap Y6. Through the arrangement of the suspended signal line 404 in the column gap, the vertical signal lines corresponding to the sub-pixel group may be more evenly distributed, the opening ratio of the sub-pixels in the sub-pixel group may be uniform, the display uniformity of the display panel is improved, and therefore the display quality is improved.

Figure 4:
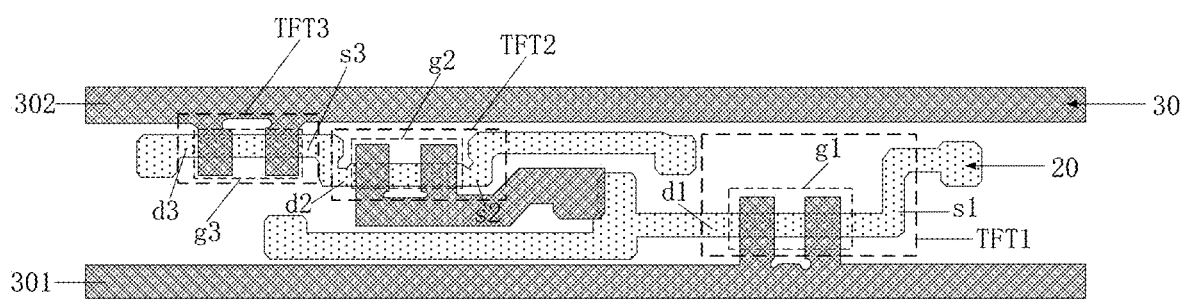
FIG. 4 is a schematic top view of a stacked structure of a semiconductor layer and a gate conductive layer in an embodiment of the present disclosure.
Figure 6:
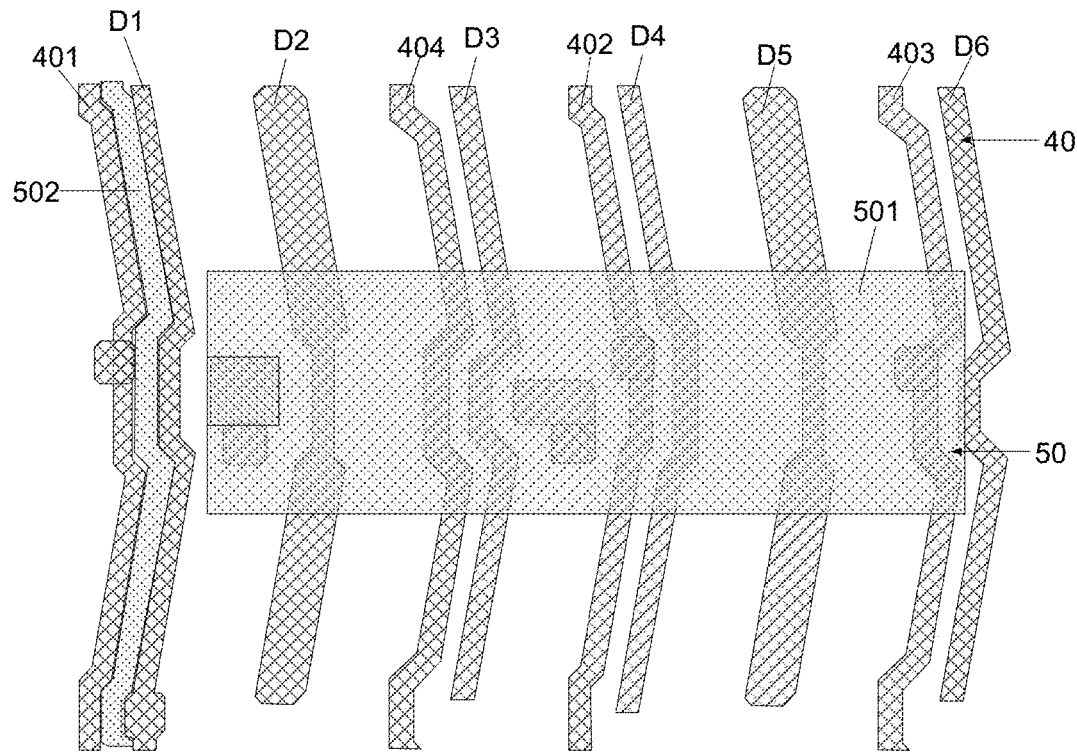
FIG. 6 is a schematic top view of a stacked structure of a first conductive layer and a second conductive layer in an embodiment of the present disclosure.
Figure 7:
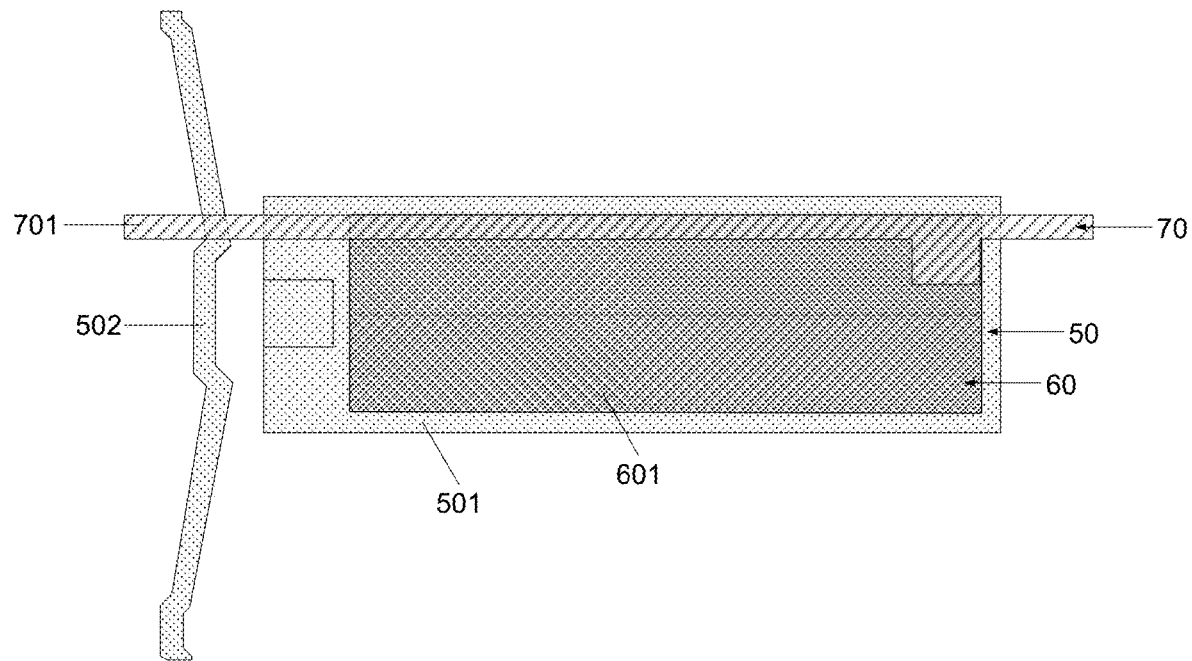
FIG. 7 is a schematic top view of a stacked structure of a second conductive layer, a photosensitive detection layer, and a third conductive layer in an embodiment of the present disclosure.

In order to illustrate structures of respective film layers more clearly, structures of part of the film layers in the display panel are shown in FIGS. 4 to 7. FIG. 4 is a schematic top view of a stacked structure of a semiconductor layer 20 and a gate conductive layer 30, FIG. 5 is a schematic top view of the first conductive layer 40, FIG. 6 is a schematic top view of a stacked structure of the first conductive layer 40 and a second conductive layer 50, and FIG. 7 is a schematic top view of a stacked structure of the second conductive layer 50, a photosensitive detection layer 60, and a third conductive layer 70. As shown in FIGS. 3 to 7, the stacking order of the respective film layers in the display panel is the semiconductor layer 20, the gate conductive layer 30, the first conductive layer 40, the second conductive layer 50, the photosensitive detection layer 60, and the third conductive layer 70 from bottom to top in sequence.

Optionally, as shown in FIGS. 3, 4, and 7, the above-described display panel provided by the embodiments of the present disclosure may further include: a first control signal line 301, and a second control signal line 302, and a bias control signal line 701 extending in the pixel row direction.

The bias control signal line 701 is coupled to the bias control signal terminal VB of the fingerprint recognition circuit 10, the first control signal line 301 is coupled to the first control terminal of the fingerprint recognition circuit 10, and the second control signal line 302 is coupled to the second control terminal of the fingerprint recognition circuit 10.

As shown in FIG. 4, the first control signal line 301 and the second control signal line 302 are both located in the gate conductive layer 30, and the gate conductive layer 30 may further include: the control terminal g1 of the first switch transistor TFT1, the control terminal g2 of the second switch transistor TFT2, and the control terminal g3 of the third switch transistor TFT3. The region where the control terminal g1 overlaps the semiconductor layer 20 is a channel region of the first switch transistor TFT1, conductive regions on both sides of the channel region of the first switch transistor TFT1 are the first pole s1 and the second pole d1 respectively, the region where the control terminal g2 overlaps the semiconductor layer 20 is a channel region of the second switch transistor TFT2, conductive regions on both sides of the channel region of the second switch transistor TFT2 are the first pole s2 and the second pole d2 respectively, the region where the control terminal g3 overlaps the semiconductor layer 20 is a channel region of the third switch transistor TFT3, and conductive regions on both sides of the channel region of the third switch transistor TFT3 are the first pole s3 and the second pole d3 respectively.

In the embodiments of the present disclosure, the first control signal line 301 is coupled to the first control terminal of the fingerprint recognition circuit 10, i.e. the first control signal line 301 is coupled to the control terminal g1 of the first switch transistor TFT1. The second control signal line 302 is coupled to the second control terminal of the fingerprint recognition circuit 10, i.e. the second control signal line 302 is coupled to the control terminal g3 of the third switch transistor TFT3.

As shown in FIG. 4, the first pole s3 of the third switch transistor TFT3 is coupled to the second pole d2 of the second switch transistor TFT2, and the control terminal g2 of the second switch transistor TFT2 is coupled to the second pole d1 of the first switch transistor TFT1. Also, as shown in FIG. 4, the control terminal g1, the control terminal g2, and the control terminal g3 may be of a dual gate structure.

As shown in FIGS. 3 and 6, the second conductive layer 50 may include: a first conductive part 501 and a touch signal line 502. The first conductive part 501 can serve as the first electrode c1 of the first capacitor C and the first electrode e1 of the photosensitive diode E. Besides, the first conductive part 501 is located in the row gap between the sub-pixels and the touch signal line 502 is located in the column gaps between the sub-pixels, which will not affect the opening ratio of the sub-pixels and can guarantee the display effect of the display panel.

As shown in FIGS. 3, 6 and 7, an area 601 in the photosensitive detection layer 60 represents the position where a photosensitive semiconductor layer in the photosensitive diode E is located. The photosensitive semiconductor layer 601 may include a first semiconductor layer, an intrinsic semiconductor layer, and a second semiconductor layer which are stacked. The first semiconductor layer is an N-type semiconductor layer and the second semiconductor layer is a P-type semiconductor layer, or the first semiconductor layer is a P-type semiconductor layer and the second semiconductor layer is an N-type semiconductor layer.

In some embodiments, a transparent conductive layer may also be arranged on the photosensitive semiconductor layer 601. The transparent conductive layer may be made of a transparent conductive oxide such as indium tin oxide (ITO). A pattern of the transparent conductive layer may coincide with the photosensitive semiconductor layer 601 in position. Furthermore, the pattern of the transparent conductive layer may serve as the second electrode c2 of the first capacitor C and the second electrode e2 of the photosensitive diode E. The arrangement of the transparent conductive layer on the photosensitive semiconductor layer 601 does not affect the photosensitive detection circuit in receiving the reflected light from the fingerprint, so the fingerprint detection effect is not affected.

The third conductive layer 70 includes the bias control signal line 701 which is coupled to the pattern of the transparent conductive layer, i.e., the bias control signal line 701 is coupled to the photosensitive detection circuit so that a bias control signal may be provided to the photosensitive detection circuit.

The bias control signal line 701, the first control signal line 301, and the second control signal line 302 are located in the row gap X in the sub-pixel group corresponding to the coupled fingerprint recognition circuit 10 and arranged on two sides of the fingerprint recognition circuit 10. As such, the bias control signal line 701, the first control signal line 301, and the second control signal line 302 do not occupy the opening areas of the sub-pixels, so the display effect of the display panel is not affected. In addition, the bias control signal line 701, the first control signal line 301, and the second control signal line 302 are arranged on the two sides of the fingerprint recognition circuit 10 to facilitate coupling to a signal terminal in the fingerprint recognition circuit 10, thereby allowing reasonable utilization of space in the display area.

In the above-described display panel provided by the embodiments of the present disclosure, as shown in FIGS. 3 to 7, the bias control signal line 701 and the second control signal line 302 are located on the same side in the row gap X, and the first control signal line 301 is located on the other side in the row gap X, so that three signal lines extending in the sub-pixel row direction are distributed on both sides in the row gap X and the space in the row gap X may be reasonably utilized. Besides, the three signal lines may be easily coupled to the signal terminal in the fingerprint recognition circuit 10.

The bias control signal line 701 and the second control signal line 302 are on different film layers to avoid shorting between the bias control signal line 701 and the second control signal line 302. The first control signal line 301 and the second control signal line 302 may be on the same layer, e.g., they can both be located in the gate conductive layer 30 and the bias control signal line 701 may be located in the third conductive layer 70.

Based on the same inventive concept, embodiments of the present disclosure further provide a display device including the above-described display panel. The display device may be applied to any product or component having a display function, such as a mobile phone, a tablet, a television, a display, a laptop, a digital photo frame, and a navigator. Since the problem solving principle of the display device is similar to that of the above-described display panel, implementation of the display device may be referred to the implementation of the above-described display panel, and the repetition thereof will not be described.

Based on the same inventive concept, embodiments of the present disclosure further provide a method for driving the above fingerprint recognition circuit. Since the problem solving principle of the driving method is similar to that of the above-described fingerprint recognition circuit, implementation of the driving method may be referred to the implementation of the above-described fingerprint recognition circuit, and the repetition thereof will not be described.

Figure 8:
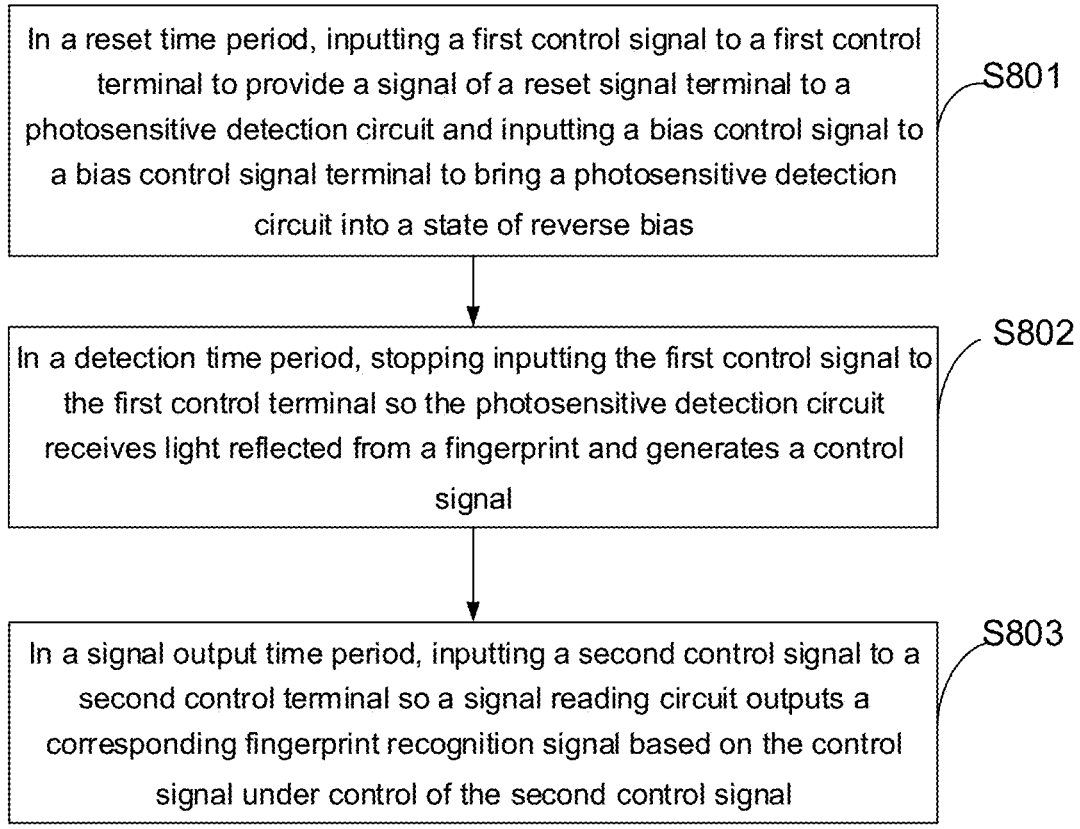
FIG. 8 is a flow diagram of a method for driving the fingerprint recognition circuit provided by an embodiment of the present disclosure.

As shown in FIG. 8, the method for driving the fingerprint recognition circuit provided by the embodiments of the present disclosure includes the following steps.

S801, in a reset time period, a first control signal is input to a first control terminal to provide a signal of a reset signal terminal to a photosensitive detection circuit, and a bias control signal is input to a bias control signal terminal so the photosensitive detection circuit is in a state of reverse bias.

S802, in a detection time period, inputting of the first control signal to the first control terminal is stopped, so that the photosensitive detection circuit receives light reflected from a fingerprint and generates a control signal.

S803, in a signal output time period, a second control signal is input to a second control terminal so that a signal reading circuit outputs a corresponding fingerprint recognition signal based on the control signal under control of the second control signal.

As shown in FIGS. 1 and 2, in step S801, in the reset time period T1, the first control signal v1 is input to the first control terminal V1, the bias control signal vb is input to the bias control signal terminal VB, and the reset signal vr is input to the reset signal terminal VR, such that the reset control circuit 102 provides the reset signal vr to the photosensitive detection circuit 101 under the control of the first control signal v1, thereby bringing the photosensitive detection circuit 101 into the state of reverse bias.

In step S802, in the detection time period T2, inputting of the first control signal v1 to the first control terminal V1 is stopped so each photosensitive detection circuit 101 in a display device receives the light reflected from the fingerprint at the same bias reference. As shown in FIG. 2, v denotes the control signal generated by the photosensitive detection circuit, and the photosensitive detection circuit 101 converts the received light reflected from the fingerprint into an electrical signal, thereby causing changes of the control signal v. For example, the control signal v is reduced by Δv in the figure. Due to the difference in reflectivity between fingerprint valleys and fingerprint ridges, the light received by different photosensitive detection circuits 101 is different in intensity, so the changes Δv of the control signals v generated by the different photosensitive detection circuits 101 are different.

In step S803, in the signal output time period T3, the second control signal v2 is input to the second control terminal V2, and the signal reading circuit 103 outputs the corresponding fingerprint recognition signal based on the control signal v under control of the second control signal v2. The fingerprint recognition signal is an output signal vo of the signal reading circuit 103. Due to the difference in reflectivity between the fingerprint valleys and the fingerprint ridges, the control signals v generated by the different photosensitive detection circuits 101 are different, so the fingerprint recognition signals output by the signal reading circuits 103 are different. Therefore, a fingerprint pattern may be obtained based on the fingerprint recognition signals output by the signal reading circuits 103.

According to the fingerprint recognition circuit, the method for driving the fingerprint recognition circuit, the display panel and the displace device provided by the embodiments of the present disclosure, the photosensitive detection circuit, the reset control circuit, and the signal reading circuit are arranged. Through mutual cooperation of these three circuits, fingerprint recognition with high detection accuracy may be achieved. Besides, the structure of the fingerprint recognition circuit is simple, thus a fingerprint recognition sensor integrated into the display device will not increase the complexity of the circuit structure in the display device.

While the preferred embodiments of the present disclosure have been described, those skilled in the art may make further variations and modifications of these embodiments upon learning the basic inventive concepts. It is therefore intended that the appended claims be construed to include the preferred embodiments along with all variations and modifications that fall within the scope of the disclosure.

Apparently, those skilled in the art may make various modifications and variations to the embodiments of the present disclosure without departing from the spirit and scope of the embodiments of the present disclosure. Thus, if the modifications and variations to the embodiments of the present disclosure are under the scope of the claims of the present disclosure and their equivalents, the present disclosure is also intended to include such modifications and variations.

What is claimed is:

1. A display panel, comprising:
   a base substrate,
   a plurality of sub-pixels arranged in an array on the base substrate, and
   a fingerprint recognition circuit
   wherein the fingerprint recognition circuit is located in a row gap between adjacent sub-pixels;
   one fingerprint recognition circuit corresponds to one sub-pixel group;
   the sub-pixel group comprises two rows and six columns of sub-pixels, and the fingerprint recognition circuit is located in the row gap between the two rows of the sub-pixels in the corresponding sub-pixel group; and
   the fingerprint recognition circuit comprises:
      a photosensitive detection circuit, coupled to a bias control signal terminal and configured to receive light reflected from a fingerprint and generate a control signal;
      a reset control circuit, coupled to a reset signal terminal, a first control terminal, and the photosensitive detection circuit respectively, and configured to provide a signal of the reset signal terminal to the photosensitive detection circuit under control of the first control terminal; and
      a signal reading circuit, coupled to the photosensitive detection circuit, a power supply terminal, a second control terminal, and a signal output terminal respectively, and configured to output a corresponding fingerprint recognition signal based on the control signal under control of the second control terminal.

2. The display panel according to claim 1, wherein the photosensitive detection circuit comprises:
   a first capacitor; and
   a photosensitive diode;
   wherein a first electrode of the first capacitor is coupled to a first electrode of the photosensitive diode, and a second electrode of the first capacitor is coupled to a second electrode of the photosensitive diode; and the second electrode of the photosensitive diode is coupled to the bias control signal terminal.

3. The display panel according to claim 2, wherein the reset control circuit comprises:
 a first switch transistor;
 wherein a control terminal of the first switch transistor is coupled to the first control terminal, a first pole of the first switch transistor is coupled to the reset signal terminal, and a second pole of the first switch transistor is coupled to the photosensitive detection circuit.

4. The display panel according to claim 2, wherein the signal reading circuit comprises:
 a second switch transistor; and
 a third switch transistor;
 wherein a control terminal of the second switch transistor is coupled to the photosensitive detection circuit, a first pole of the second switch transistor is coupled to the power supply terminal, and a second pole of the second switch transistor is coupled to a first pole of the third switch transistor; and
 a control terminal of the third switch transistor is coupled to the second control terminal, and a second pole of the third switch transistor is coupled to the signal output terminal.

5. The display panel according to claim 1, further comprising: a plurality of data signal lines, a reading signal line, a power supply signal line, and a reset signal line extending in a sub-pixel column direction; wherein
 the reading signal line is coupled to the signal output terminal of the fingerprint recognition circuit, the power supply signal line is coupled to the power supply terminal of the fingerprint recognition circuit, and the reset signal line is coupled to the reset signal terminal of the fingerprint recognition circuit;
 extension directions of the reading signal line, the power supply signal line, and the reset signal line coincide with extension directions of the data signal lines;
 the sub-pixel group is provided with six column gaps, wherein the column gaps each is located on a same side of a respective one of the columns of the sub-pixels; and
 the data signal lines, the reading signal line, the power supply signal line, and the reset signal line are all located in the column gaps of the sub-pixel group corresponding to the coupled fingerprint recognition circuit.

6. The display panel according to claim 5, wherein each of the data signal lines is arranged in a respective one of the column gaps in the sub-pixel group; and
 the reading signal line, the power supply signal line, and the reset signal line are respectively located in different column gaps.

7. The display panel according to claim 6, wherein only one data signal line is arranged in the second column gap in the sub-pixel group; and only one data signal line is arranged in the fifth column gap in the sub-pixel group.

8. The display panel according to claim 7, wherein each of line widths of the data signal lines in the second and fifth column gaps in the sub-pixel group is larger than a line width of the data signal line in a remaining column gap.

9. The display panel according to claim 7, further comprising:
 a suspended signal line located in a column gap; wherein the suspended signal line is located in a different column gap from the reading signal line, the power supply signal line, and the reset signal line.

10. The display panel according to claim 1, further comprising: a bias control signal line, a first control signal line, and a second control signal line extending in a pixel row direction; wherein
 the bias control signal line is coupled to the bias control signal terminal of the fingerprint recognition circuit, the first control signal line is coupled to the first control terminal of the fingerprint recognition circuit, and the second control signal line is coupled to the second control terminal of the fingerprint recognition circuit; and
 the bias control signal line, the first control signal line, and the second control signal line are located in the row gap in the sub-pixel group corresponding to the coupled fingerprint recognition circuit and are arranged on two sides of the fingerprint recognition circuit.

11. The display panel according to claim 10, wherein the bias control signal line and the second control signal line are on a same side of the fingerprint recognition circuit in the row gap and the first control signal line is on the other side of the fingerprint recognition circuit in the row gap; and
 the bias control signal line and the second control signal line are located on different film layers.

12. A display device, comprising the display panel according to claim 1.

13. A method for driving the fingerprint recognition circuit according to claim 1, comprising:
 in a reset time period, inputting a first control signal to the first control terminal to provide the signal of the reset signal terminal to the photosensitive detection circuit and inputting a bias control signal to the bias control signal terminal to bring the photosensitive detection circuit into a state of reverse bias;
 in a detection time period, stopping inputting the first control signal to the first control terminal so the photosensitive detection circuit receives light reflected from the fingerprint and generates the control signal; and
 in a signal output time period, inputting a second control signal to the second control terminal so the signal reading circuit outputs the corresponding fingerprint recognition signal based on the control signal under control of the second control signal.

* * * * *